US005940586A

United States Patent [19]
Bealkowski et al.

[11] Patent Number: 5,940,586
[45] Date of Patent: Aug. 17, 1999

[54] METHOD AND APPARATUS FOR DETECTING THE PRESENCE OF AND DISABLING DEFECTIVE BUS EXPANSION DEVICES OR INDUSTRY STANDARD ARCHITECTURE (ISA) ADAPTERS

[75] Inventors: Richard Bealkowski; Michael Robert Turner, both of Austin, Tex.

[73] Assignee: International Business Machines Corporation, Armonk, N.Y.

[21] Appl. No.: 08/976,897

[22] Filed: Nov. 24, 1997

Related U.S. Application Data

[63] Continuation of application No. 08/600,082, Feb. 12, 1996, abandoned, which is a continuation-in-part of application No. 08/543,772, Oct. 16, 1995, abandoned.

[51] Int. Cl.⁶ .................................................. G06F 13/00
[52] U.S. Cl. ......................... 395/182.03; 395/836
[58] Field of Search ...................... 395/182.03, 183.12, 395/200.52, 284, 652, 830, 836

[56] References Cited

U.S. PATENT DOCUMENTS

| | | | |
|---|---|---|---|
| 3,810,120 | 5/1974 | Huettner et al. | 395/182.03 |
| 4,025,906 | 5/1977 | Riikonen | 395/836 |
| 4,621,322 | 11/1986 | Suzuki et al. | 364/200 |
| 4,654,857 | 3/1987 | Samson et al. | 395/182.03 |
| 4,709,341 | 11/1987 | Matsuda | 364/550 |
| 4,862,355 | 8/1989 | Newman et al. | 395/836 |
| 4,885,683 | 12/1989 | Coogan | 364/200 |
| 5,036,481 | 7/1991 | Lunsford et al. | 364/708 |
| 5,109,517 | 4/1992 | Houda et al. | 395/800 |
| 5,161,102 | 11/1992 | Griffin et al. | 395/800 |
| 5,206,860 | 4/1993 | Brown et al. | 371/20.1 |
| 5,237,690 | 8/1993 | Bealkowski et al. | 395/700 |
| 5,241,643 | 8/1993 | Durkin et al. | 395/425 |
| 5,321,814 | 6/1994 | Barajas | 395/828 |
| 5,386,567 | 1/1995 | Lien et al. | 395/700 |
| 5,410,717 | 4/1995 | Floro | 395/800 |
| 5,426,739 | 6/1995 | Lin et al. | 395/325 |
| 5,440,755 | 8/1995 | Harwer et al. | 395/800 |
| 5,454,081 | 9/1995 | Thome | 395/281 |
| 5,454,084 | 9/1995 | Uchikoga | 395/281 |
| 5,504,905 | 4/1996 | Cleary et al. | 395/700 |
| 5,511,986 | 4/1996 | Casey et al. | 439/188 |
| 5,517,646 | 5/1996 | Piccirillo et al. | 395/651 |
| 5,530,895 | 6/1996 | Enstrom | 395/829 |
| 5,535,415 | 7/1996 | Kondou et al. | 395/828 |
| 5,537,663 | 7/1996 | Belmont | 395/837 |
| 5,546,533 | 8/1996 | Koyama | 395/182.03 |
| 5,548,782 | 8/1996 | Michael et al. | 395/835 |
| 5,559,965 | 9/1996 | Oztaskin et al. | 395/284 |
| 5,577,206 | 11/1996 | Friedrich et al. | 395/200.02 |
| 5,586,268 | 12/1996 | Chen et al. | 395/250 |
| 5,590,376 | 12/1996 | Kou | 395/839 |
| 5,594,873 | 1/1997 | Garrett | 395/281 |
| 5,628,027 | 5/1997 | Belmont | 395/821 |
| 5,634,074 | 5/1997 | Devon et al. | 395/828 |
| 5,634,075 | 5/1997 | Smith et al. | 395/829 |
| 5,634,137 | 5/1997 | Merkin et al. | 395/830 |
| 5,655,148 | 8/1997 | Richman et al. | 395/828 |
| 5,729,552 | 3/1998 | Yorimitsu | 371/21.1 |

OTHER PUBLICATIONS

Tanenbaum, A.D., Structured Computer Organization (2d ed.), N.J., Prentice–Hall, p. 11, 1984.
"Small Computer System Interface Bus Isolation for a Small Computer System Controller Adapter", IBM Technical Disclosure Bulletin, vol., 37, No. 10, Oct. 1994, pp. 617–618.

*Primary Examiner*—Lance Leonard Barry
*Attorney, Agent, or Firm*—Volel Emile

[57] ABSTRACT

The present invention provides a method and apparatus for enabling or disabling an ISA adapter or bus expansion device. In one embodiment of the invention, the housing slot is first checked to see whether the device is installed. If the device is installed and is malfunctioning or defective, the device is then isolated or disabled to allow the system to continue to operate. In another embodiment of the invention, a check is done to determine whether the housing slot has changed from an empty to a full status and vice versa. This check determines whether configuration status of an adapter, stored in memory, should be deleted. This check also allows for the differentiation of a PNP adapter card from a legacy adapter card.

8 Claims, 12 Drawing Sheets

| | | |
|---:|:---:|:---|
| -MEM C,16 | D1   C1 | SBHE |
| -I/O C,16 | | LA23 |
| IRQ10 | | LA22     250 |
| IRQ11 | | LA21 |
| IRQ12 | | LA20 |
| IRQ15 | | LA19 |
| IRQ14 | | LA18 |
| -DACK0 | | LA17 |
| DRQ0 | | -MEMR |
| -DACK5 | D10 C10 | -MEMW |
| DRQ5 | | SD08 |
| -DACK6 | | SD09 |
| DRQ6 | | SD10 |
| -DACK7 | | SD11 |
| DRQ7 | | SD12 |
| +5 Vdc | | SD13 |
| -MASTER | | SD14 |
| GND | D18 C18 | SD15 |
| | | |
| GND | B1   A1 | -I/O CH CK |
| RESET DRV | | SD7 |
| +5 Vdc | | SD6 |
| IRQ 9 | | SD5 |
| -5 Vdc | | SD4 |
| DRQ2 | | SD3 |
| -12 Vdc | | SD2 |
| OWS | | SD1 |
| +12 Vdc | | SD0 |
| GND | B10 A10 | -I/O CH RDY |
| -SMEMW | | AEN |
| -SMEMR | | SA19 |
| -IOW | | SA18 |
| -IOR | | SA17 |
| -DACK3 | | SA16 |
| DRQ3 | | SA15 |
| -DACK1 | | SA14 |
| DRQ1 | | SA13 |
| -Refresh | | SA12 |
| CLK | B20 A20 | SA11 |
| IRQ7 | | SA10 |
| IRQ6 | | SA9 |
| IRQ5 | | SA8 |
| IRQ4 | | SA7 |
| IRQ3 | | SA6 |
| -DACK2 | | SA5 |
| T/C | | SA4 |
| BALE | | SA3 |
| +5 Vdc | | SA2 |
| OSC | | SA1 |
| GND | B31 A31 | SA0 |

METHOD AND APPARATUS FOR DETECTING THE PRESENCE OF AND DISABLING DEFECTIVE BUS EXPANSION DEVICES OR INDUSTRY STANDARD ARCHITECTURE (ISA) ADAPTERS

This is a continuation of application Ser. No. 08/600,082 filed Feb. 12, 1996, now abandoned which is a continuation-in-part of application Ser. No. 08/543,772, filed on Oct. 16, 1995, now abandoned.

BACKGROUND OF THE INVENTION

1. Field of the Invention

The present invention relates to a bus expansion device control and, more particularly, to a method and apparatus for detecting the presence of a bus expansion device and selectively enabling or disabling the device.

2. Description of the Related Art

Legacy and Plug and Play (PNP) are two types of bus expansion devices or adapter cards that are used to provide additional functionalities to computers. Additional functionalities may comprise modem functionality, graphics capability, small computer system interface (SCSI) capability, networking capability, etc. To provide communication between the additional cards and the computer system, an expansion bus is typically used. One expansion bus that is most often used is the Industry Standard Architecture (ISA) bus. The ISA bus is the expansion bus defined by the IBM Personal Computer/AT (PC/AT). Since the introduction of the PC/AT, the ISA bus has had widespread application in personal computers.

Legacy ISA adapter cards were the first adapter cards to be available in the industry. These adapter cards can only be configured manually. Manual configuration entails the setting of switches and the use of hardware jumpers to allocate resources to the adapter. These resources may include input/output (I/O) ports, direct memory access (DMA) channels, interrupt request (IRQ) levels, and memory address regions.

PNP ISA adapters, on the other hand, are configurable under software control. That is, software within the computer system can be used to allocate the resources to the adapter. Unfortunately, PNP adapters are relatively new in the industry and therefore few of them exist. Since there is a large investment in legacy adapters, the legacy adapters are carried forward to computer systems supporting PNP adapters. Thus, legacy and PNP ISA adapters often coexist in a single computer system. Consequently, the ability to detect and identify adapters on a per slot basis needs to be provided.

When a computer system is configured, the resource assignments are made in such a way as to avoid conflicts. That is, a resource such as IRQ 5 cannot be allocated to more than one adapter. If conflicting resource allocations are made, the system may become inoperable. In addition, a malfunctioning or defective adapter card can also cause the system to become inoperable.

Thus, there is a need in the art for a method and apparatus that detect and identify adapters on a per slot basis as well as isolate malfunctioning or misconfigured adapters to allow for continuous system operability.

SUMMARY

The need in the art is addressed by the present invention. The present invention provides a method and apparatus for enabling or disabling an ISA adapter or bus expansion device. In one embodiment of the invention, the housing slot is first checked to see whether the device is installed. If the device is installed and is malfunctioning or defective, the device is then isolated or disabled to allow the system to continue to operate.

In another embodiment of the invention, a check is done to determine whether the housing slot has changed from an empty to a full status and vice versa. This check determines whether configuration status of an adapter, stored in memory, should be deleted. This check also allows for the differentiation of a PNP from a legacy adapter.

DETAILED DESCRIPTION OF THE PREFERRED EMBODIMENT

The following detailed description is of the best presently contemplated mode for carrying out the invention. This description is not to be viewed in a limiting sense, but is made merely for the purpose of illustrating the general principles of the invention, the scope of which is only defined by the appended claims.

Figure 1:
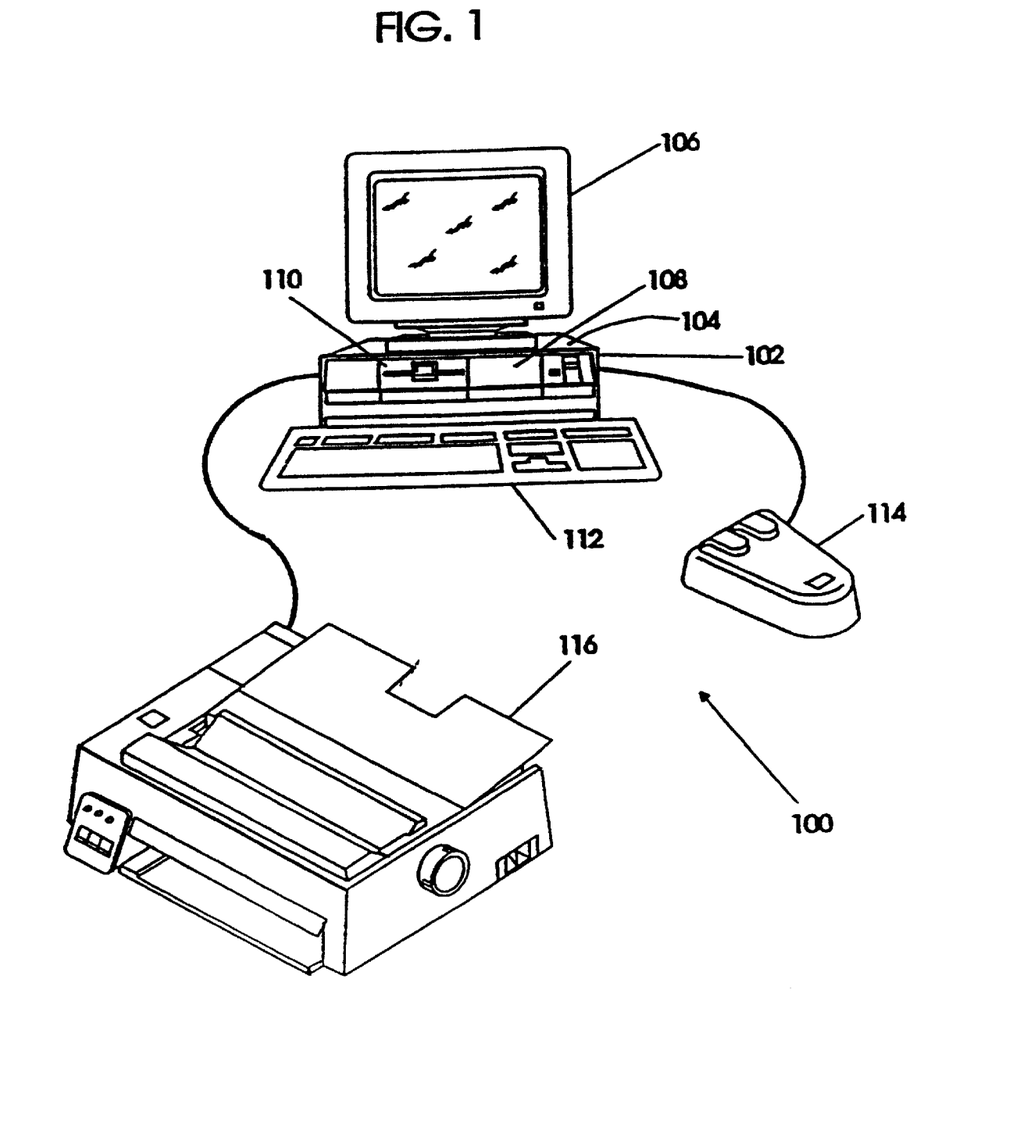
FIG. 1 is a perspective view of a typical personal computer system.

Referring to FIG. 1, there is shown a personal computer system 100 which employs the present invention. The personal computer system 100 includes a system unit 102 having a suitable enclosure or casing 104, output device or monitor 106 (such as a convention video display), input devices such as a keyboard 112, a mouse 114, and an optional output device such as a printer 116. Finally, the system unit 102 may include one or more mass storage devices such as a diskette drive 110 (operable with a diskette—not shown) and a hard disk drive (hardfile) 108.

Figure 2:
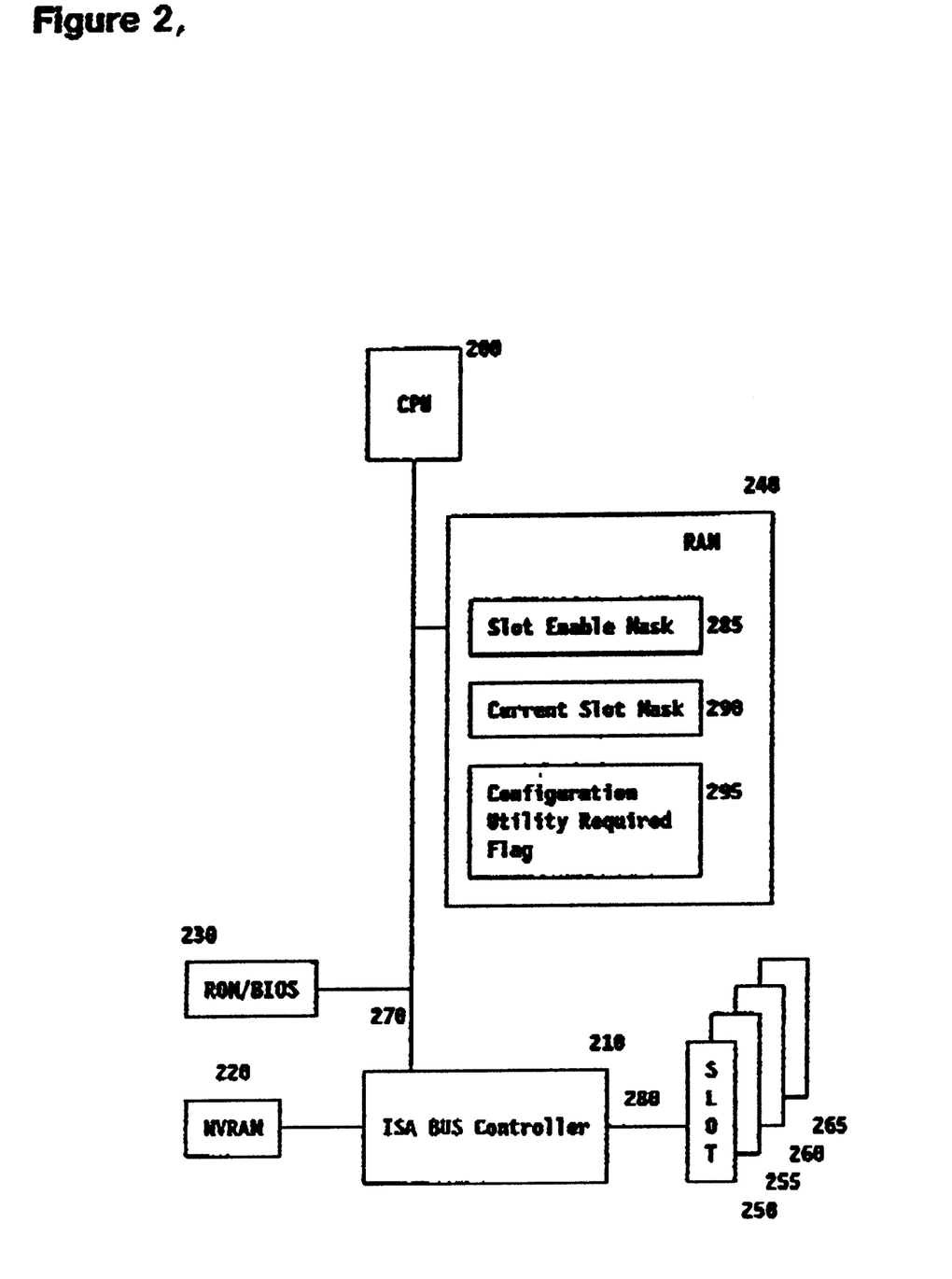
FIG. 2 is a block diagram of the core logic for the computer system of FIG. 1.

Referring now to FIG. 2, there is shown a simplified block diagram of the logic contained in system unit 102. Central Processing Unit (CPU) 200 is electrically coupled to CPU Bus 270. CPU 200 may be one of the available microprocessors based on the Intel x86 architecture, the IBM PowerPC microprocessor architecture, and likewise other suitable CPU selections may be employed. CPU Bus 270 provides address, data, and control signals to and from CPU 200. ROM/BIOS 230 contains programs to initialize and test computer system 100. ROM/BIOS 230 also contains programs to interface to I/O devices such as hardfile 108. ROM/BIOS 230 additionally contains programs to determine configuration data for computer system 100. Random Access Memory (RAM) 240 provides read/write storage for the execution of programs and the storage of data. RAM 240 contains Slot Enable Mask 285, Current Slot Mask 290, and Configuration Utility Required Flag 295, all of the current invention. CPU 200, ROM/BIOS 230, RAM 240, and ISA Bus Controller 210 are all electrically coupled via CPU Bus 270. ISA Bus Controller 210 interfaces CPU Bus 270 to NVRAM 220 and ISA Expansion Slots 250, 255, 260, and 265. Four ISA Expansion Slots are shown, but the number of slots may vary depending on the particular system requirements. ISA Bus Controller 210 interfaces to ISA Expansion Slots 250–265 via ISA Bus 280. Non-Volatile RAM (NVRAM) 220 is a data storage device capable of retaining its data contents even when external power is removed from the system.

Figure 3:
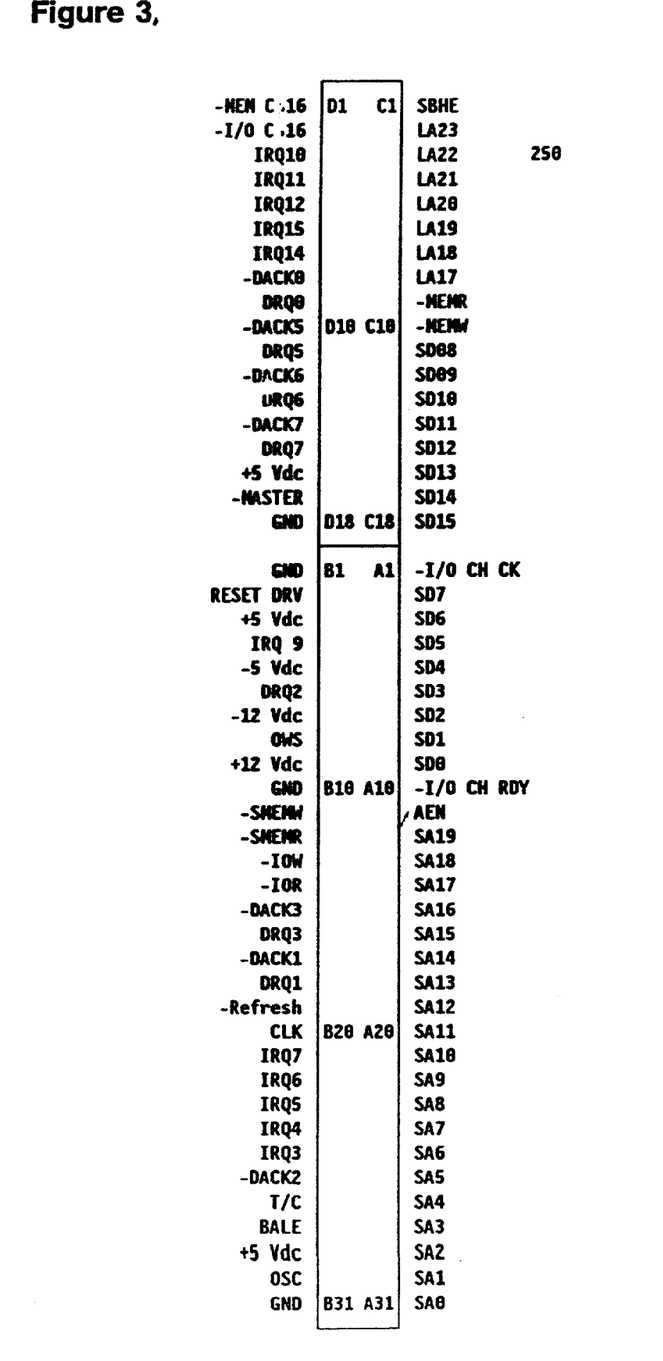
FIG. 3 is a block diagram showing the pinout of an ISA bus connector.

Referring now to FIG. 3, there is shown a pinout diagram of ISA Expansion Slot 250. Pin assignments are as shown, which is well known in the art.

Figure 4:
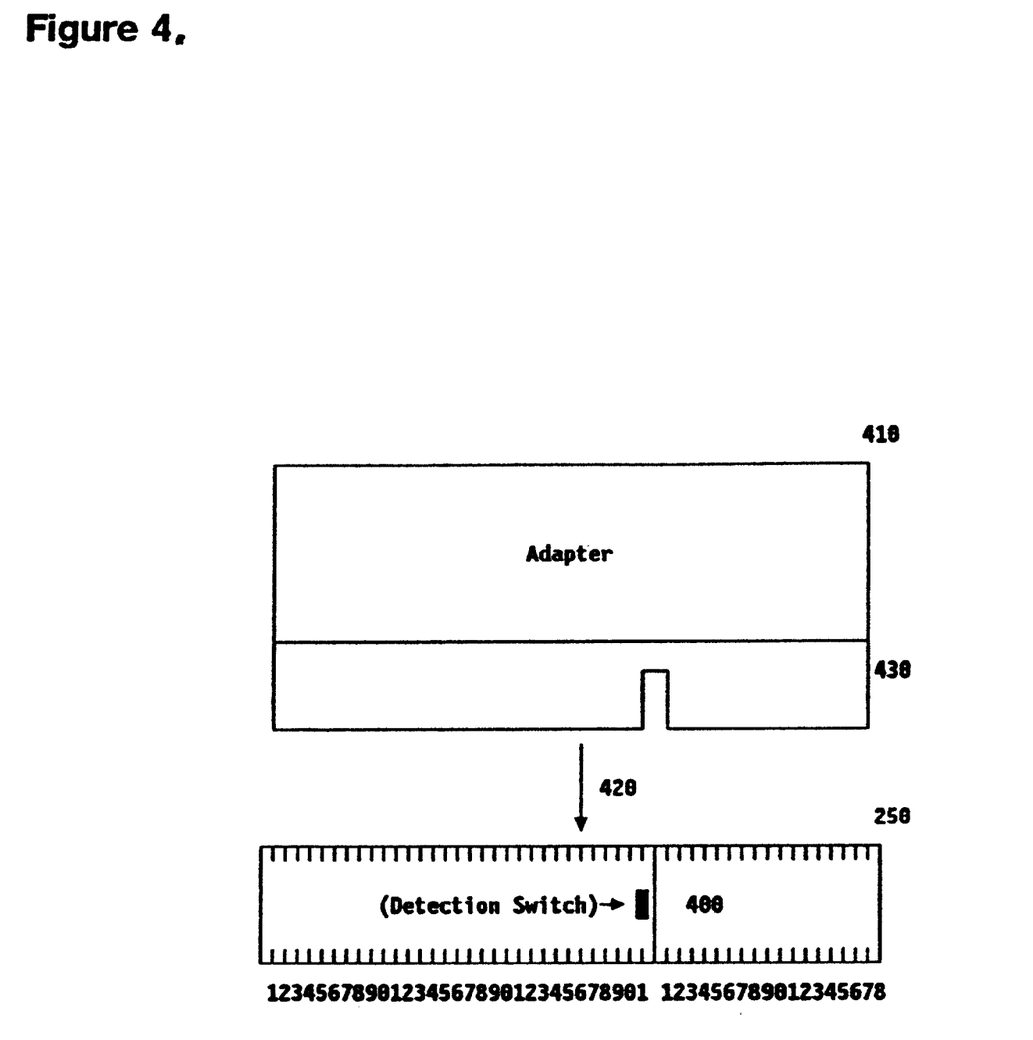
FIG. 4 is a block diagram showing an ISA adapter and an ISA bus connector showing a presence detection switch.

Referring now to FIG. 4, there is shown a block diagram of an ISA Adapter 410 and ISA Expansion Slot 250. ISA Expansion Slot 250 is shown with detection switch 400. Detection switch 400 is used to determine if an adapter is installed in ISA Expansion Slot 250. Detection switch 400 is in the OPEN state when there is no adapter installed. Detection switch 400 is in the CLOSED state when an adapter is installed. ISA Adapter 410 is inserted (shown as arrow 420) into ISA Expansion Slot 250 connecting Card Edge Tab 430 of ISA Adapter 410 with ISA Expansion Slot 250. Adapter insertion (arrow 420) results in CLOSING detection switch 400. As seen in FIG. 2, the OPEN/CLOSED status of detection switch 400 is reported to ISA bus controller over ISA Bus 280.

Figure 5:
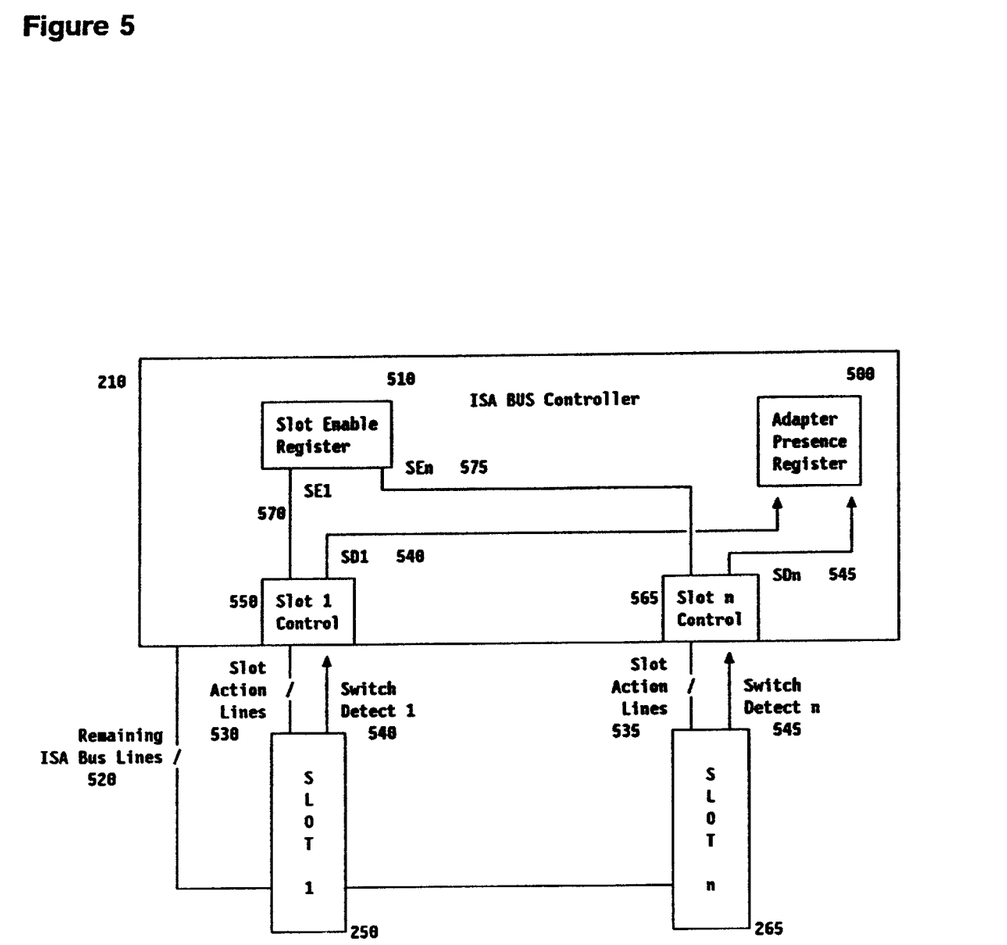
FIG. 5 is a block diagram of an enhanced ISA bus controller and ISA slots subsystem.

Referring now to FIG. 5, there is shown a detailed block diagram of ISA BUS Controller 210 and ISA Expansion Slots 250–265. ISA Bus Controller 210 contains Slot Enable Register 510. Slot Enable Register 510 is a register programmable by CPU 200. Each bit position in Slot Enable Register 510 controls a Slot Enable (SE) signal. Bit position one of Slot Enable Register 510 controls SE1 570, bit position two controls SE2 (not shown), through bit position n controlling SEn 575. Slot 1 Control 550 controls Slot Action Lines 530 for Slot 1 250 and connects Switch Detect 1 540 with Adapter Presence Register (APR) 500. APR 500 is a register which can be read by CPU 200. Each bit position of APR 500 corresponds to the detection switch state of each corresponding slot. Bit 1 of APR 500 corresponds to the detection switch state of ISA Expansion Slot 1 250 via Switch Detect 1 540 signal, bit 2 of APR 500 corresponds to the detection switch state of ISA Expansion Slot 2 via Switch Detect 2 signal (not shown), and so on through bit n of APR 500 corresponding to the detection switch state of ISA Expansion Slot n 265 via Switch Detect n 545 signal.

With continued reference to FIG. 5, Slot Control 1 550 controls Slot Action Lines 530 which is comprised of ISA Bus signals -MEMR, -MEMW, -SMEMR, -SMEMW, -IOR, and -IOW. When Slot 1 Control 550 is enabled via Slot Enable 1 570 the signals for Slot Action Lines 530 are allowed to pass to ISA Expansion Slot 1 250. When Slot 1 Control 550 is disabled via Slot Enable 1 570 the signals for Slot Action Lines 530 are not allowed to pass to ISA Expansion Slot 1 250. When an ISA Expansion Slot is disabled the result is that the adapter present in the slot is isolated from the rest of the system. Remaining ISA Bus Lines 520 are connected to ISA Expansion Slots 250–265 without selective control.

Figure 6:
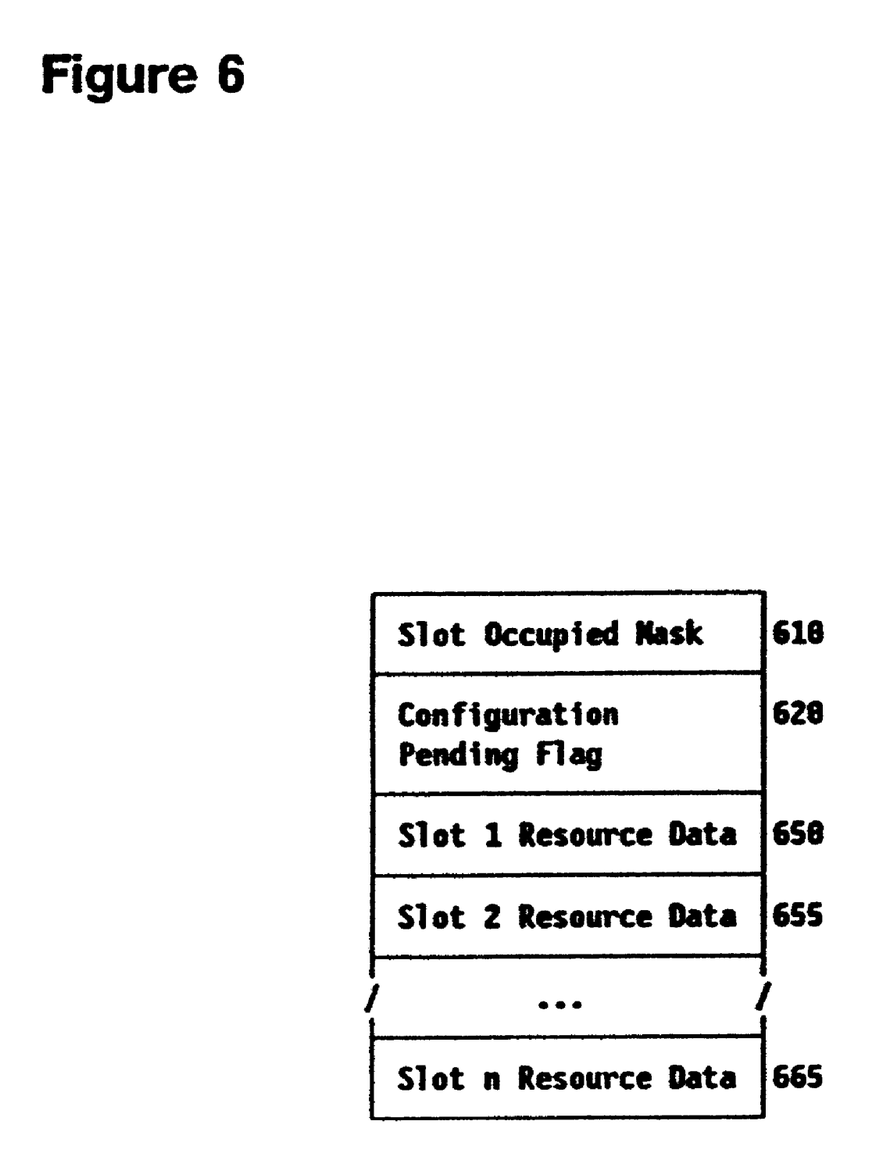
FIG. 6 is a block diagram of the contents of a non-volatile storage device.

Referring now to FIG. 6, there is shown a block diagram of the contents of NVRAM 220 as it pertains to the present invention. Slot Occupied Mask 610 is the Adapter Presence Register 500 data from the previous configuration cycle. The Configuration Pending Flag 620 indicates if a trial enablement of a new Legacy ISA adapter is in progress. Slot Resource Data 650–665 is the resource data for each corresponding ISA Expansion Slot 250–265. The data includes adapter identification and all resources used by the adapter such as I/O space, IRQs, DMA, and memory regions.

Figure 7:
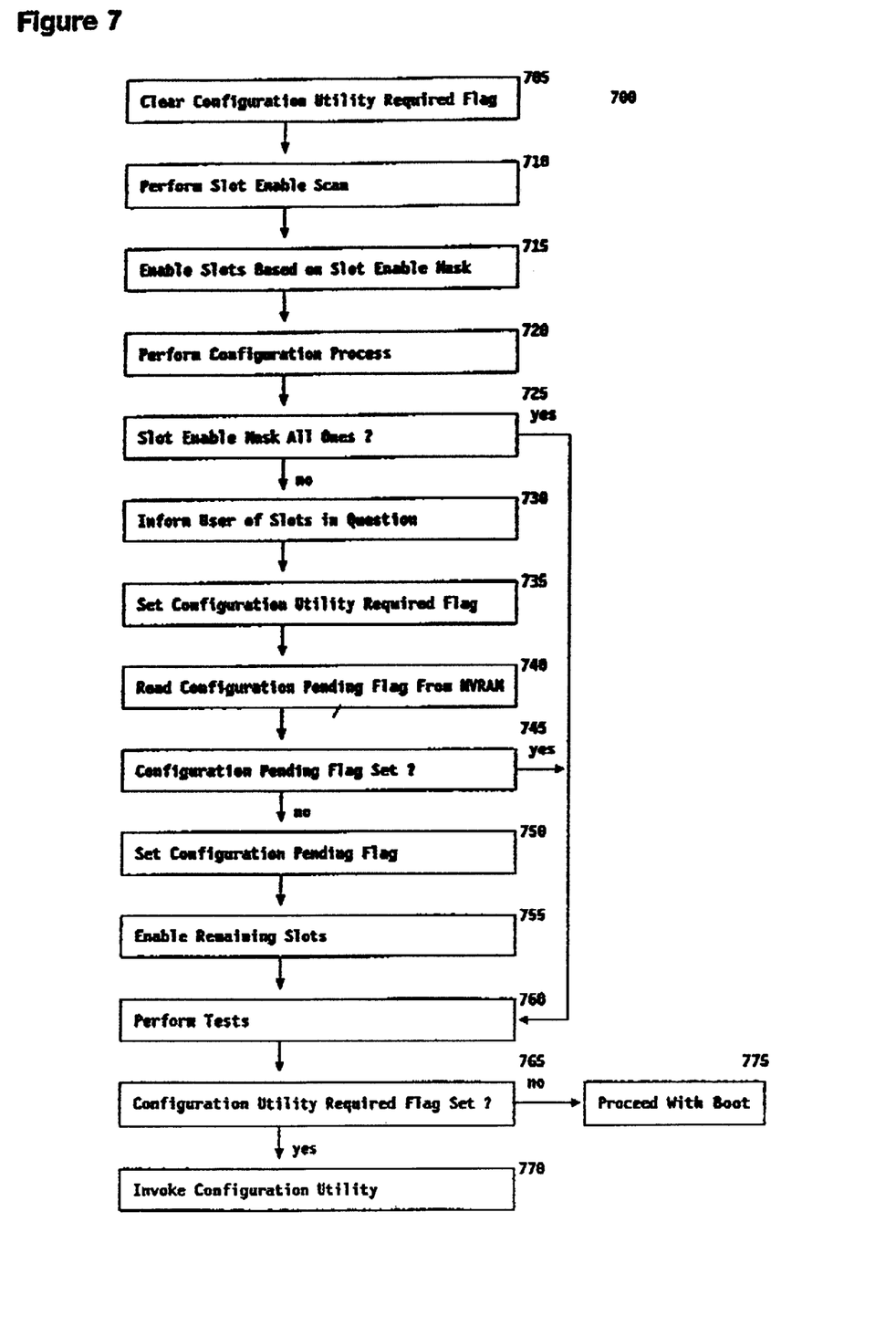
FIG. 7 is a flow diagram showing the method by which the system detects and enables ISA adapter slots.

Referring now to FIG. 7, there is shown a flow diagram of Primary Control Flow 700. First, the Configuration Utility Required Flag 295 is cleared, step 705. Next, Slot Enable Scan 800 is performed, step 710, which is described in further detail in FIG. 8. The result of the Slot Enable Scan 800 is Slot Enable Mask 285. The Slot Enable Mask 285 indicates which slots, if any, contain unconfigured Legacy ISA adapters. In step 715, ISA Expansion Slots 250–265 are selectively enabled based on the Slot Enable Mask 285 which is programmed into the Slot Enable Register 510. The Configuration Process 900 is performed which includes the assignment of resources to adapters, step 720. In step 725, the Slot Enable Mask 285 is checked. If all slots are enabled, then the ROM/BIOS 230 tests are performed, step 760. If all slots are not enabled, then the user is informed of the fact that the system has a potential problem with a slot or slots in step 730. The notification can take the form of simple short beeps, delivered in distinct groups. For example, a potential problem with slot 3 would result in beep-beep-beep in rapid succession. A potential problem with slot 2 and slot 5 would result in two beeps then a distinct pause and then five beeps. This gives the user some indication of which adapters to remove if the system cannot achieve a successful configuration. Next, Configuration Utility Required Flag 295 is set, step 735. In step 740, the Configuration Pending Flag 620 is read from NVRAM 220. If the Configuration Pending Flag 620 is set then no additional slots are enabled because a previous attempt to run Configuration Process 900 failed probably due to hardware conflicts caused by an unconfigured Legacy ISA adapter. If the Configuration Pending Flag 620 is set, as checked in step 745, then control proceeds to step 760 where ROM/BIOS 230 tests are performed. If the Configuration Pending Flag 620 is not set as determined by the check of step 745, then the Configuration Pending Flag 620 in NVRAM 220 is set, step 750. The remaining slots are then enabled (these remaining slots have unconfigured Legacy ISA adapters in them), step 755.

With continued reference to FIG. 7, control proceeds to step 760, where ROM/BIOS 230 tests are performed. The ROM/BIOS 230 testing, step 760, preferably includes the testing of hardware adapters. In the event that the testing of step 760 determines that an adapter has malfunctioned then ROM/BIOS 230 testing, step 760, can disable the slot containing the malfunctioning adapter and indicate an error to the user. As in step 730, error indication can be in the form of beeps. Next, Configuration Utility Required Flag 295 is checked, step 765. If Configuration Utility Required Flag 295 is set, as determined by the check of step 765, then the Configuration Utility 1000 is invoked, step 770. Configuration Utility 1000 is where Slot Resource Data 650–665 in NVRAM 220 can be input by the user. If the Configuration Utility Required Flag is not set, as determined by the check of step 765, then control proceeds with boot, step 775. Boot, step 775, is the process of loading and executing an operating system.

Note that if the recommended practice of adding only a single card at a time is followed, then (at most) only a single slot will be in question during any given cycle.

A system may be allowed to operate with one or more slots disabled, though system operation may be degraded. For example, consider a server which normally provides both file sharing and printer sharing. If the adapter which interfaces the system with the printer malfunctions and subsequently interferes with file sharing services then the system is effectively disabled. However, if the printer adapter malfunctions and is disabled, then the system would still be capable of providing file sharing services. The system can operate in a degraded mode, no printer sharing, until the printer adapter problem can be resolved. A file sharing only system is desirable over a completely disabled system.

Figure 8:
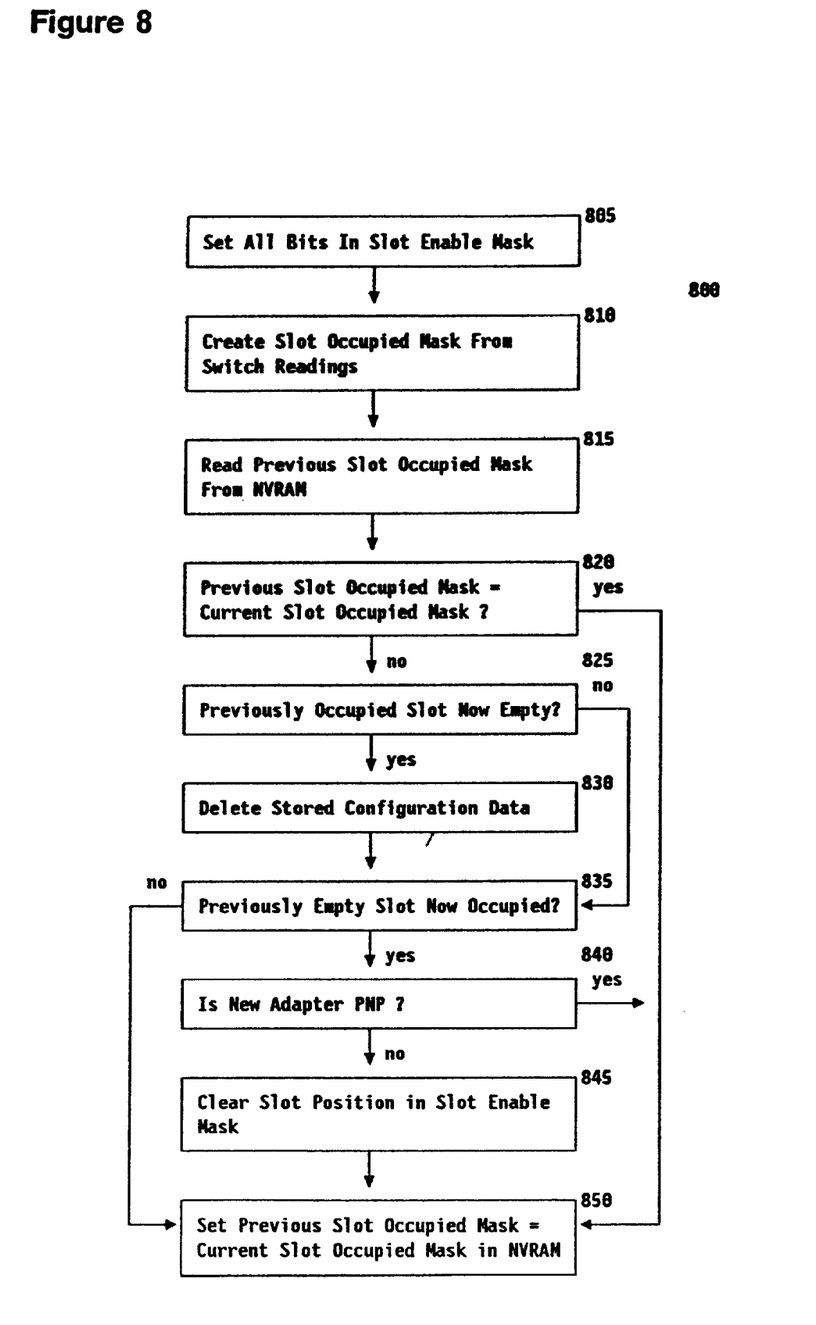
FIG. 8 is a flow diagram showing the method by which the system detects changes in configuration.

Referring now to FIG. 8, there is shown the Slot Enable Scan 800 process. First, the Slot Enable Mask 285 is set to all slots enabled, step 805. Then APR 500 is read and stored (temporarily) as Current Slot Mask 290, step 810. Next, the Slot Occupied Mask 610 is read from NVRAM 200, step 815. The Slot Occupied Mask 610 and Current Slot Mask 290 are compared in step 820. If the masks match, then no changes have occurred and the flow proceeds to step 850. If the masks differ as determined by step 820, then a change has occurred. The masks are checked to determine if an adapter has been removed, step 825. If an adapter has been removed then Slot Resource Data 650–665 in NVRAM 200 for the now empty slot or slots is deleted, step 830. If an adapter has not been removed then control passes to the check for adapter additions, step 835. If an adapter has been added then a check is made to determine if it is a PNP adapter, step 840. In the event of more than one added adapter, each slot position is processed individually and in turn. To determine if the adapter in a slot is PNP, all other slots are disabled and the PNP detection method which is well known and described in the Plug and Play ISA Specification Version 1.0a May 5, 1994 is performed. In short, some I/O operations are done, and if recognizable data is obtained the card is PNP. If the card is PNP then it is software configurable and the slot scan is complete and the flow proceeds to step 850. If the adapter is not PNP then the corresponding slot bit in the Slot Enable Mask 285 is cleared indicating that this slot is an added Legacy ISA adapter. Finally, in step 850, the Current Slot Mask 290 is stored in Slot Occupied Mask 610 in NVRAM 220.

Figure 9:
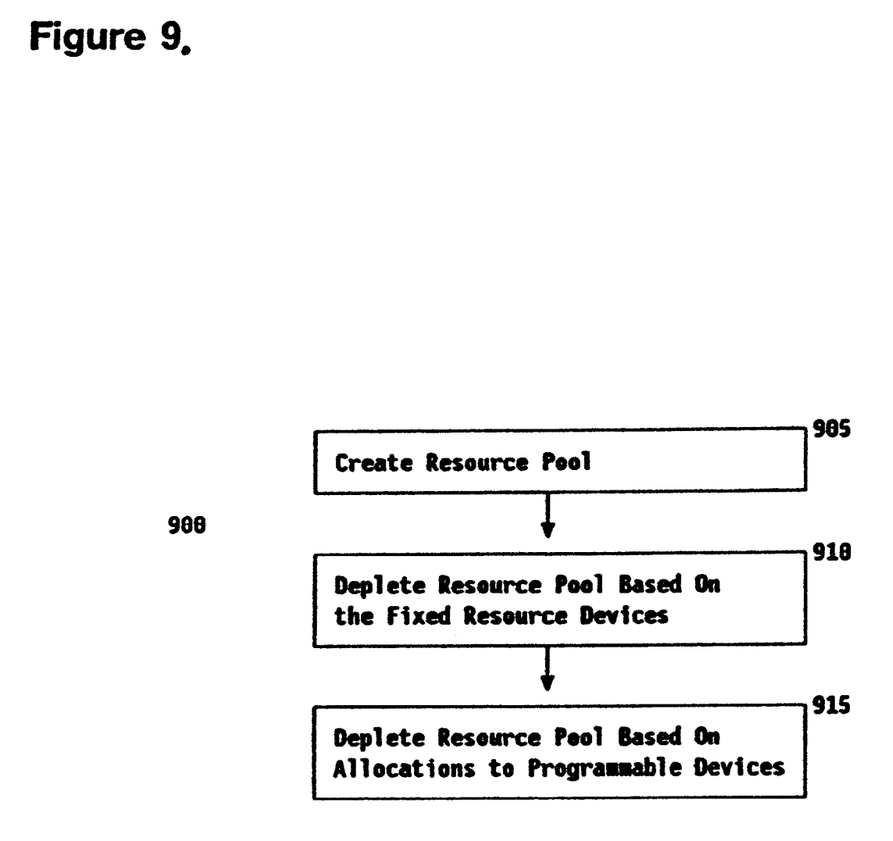
FIG. 9 is a flow diagram showing the method by which the system configures devices.

Referring now to FIG. 9, there is shown a flow diagram of the Configuration Process 900. A resource pool of all available resources is created, step 905. The pool is then depleted for all fixed resource devices in the system, including Legacy ISA adapters, step 910. The pool is then further depleted based on allocation to software configurable devices, such as PNP adapters, step 915.

Figure 10:
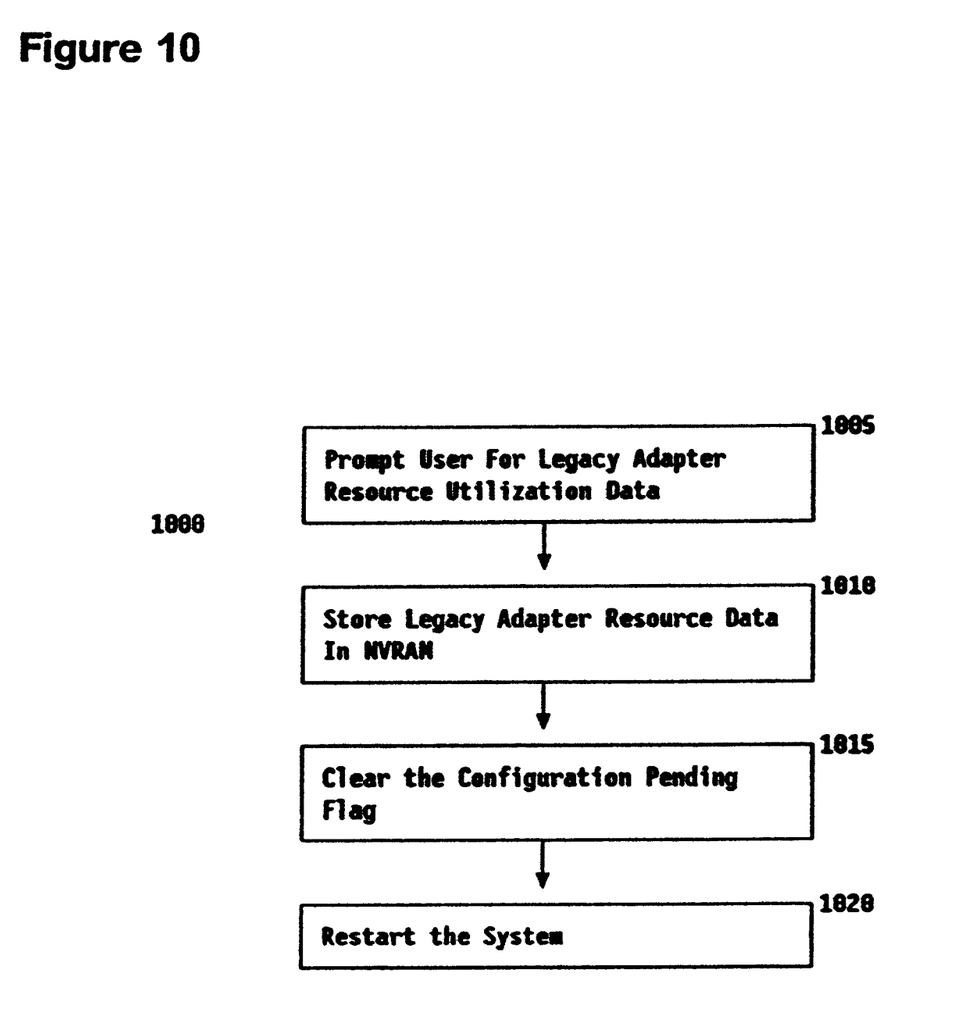
FIG. 10 is a flow diagram showing the method of the configuration utility.

Referring now to FIG. 10, there is shown a flow diagram of the Configuration Utility 1000. The Configuration Utility 1000 allows the user to input Slot Resource Data 650–665 for Legacy ISA adapters. The user is prompted for the required data, step 1005. This data is obtained by the user or servicer through recording the jumper and switch settings on the Legacy ISA adapter and correlating those with resource values found in the Legacy ISA adapter publications provided by the manufacturer. The utility stores the Slot Resource Data 650–665 in NVRAM 220, step 1010. The Configuration Utility 1000 clears the Configuration Pending Flag 620 in NVRAM 200, step 1015. The Configuration Utility 1000 restarts the system, step 1020. In addition, the Configuration Utility 1000 has the ability to display existing resource data to the user and identify any conflicts in these existing entries.

Figure 11:
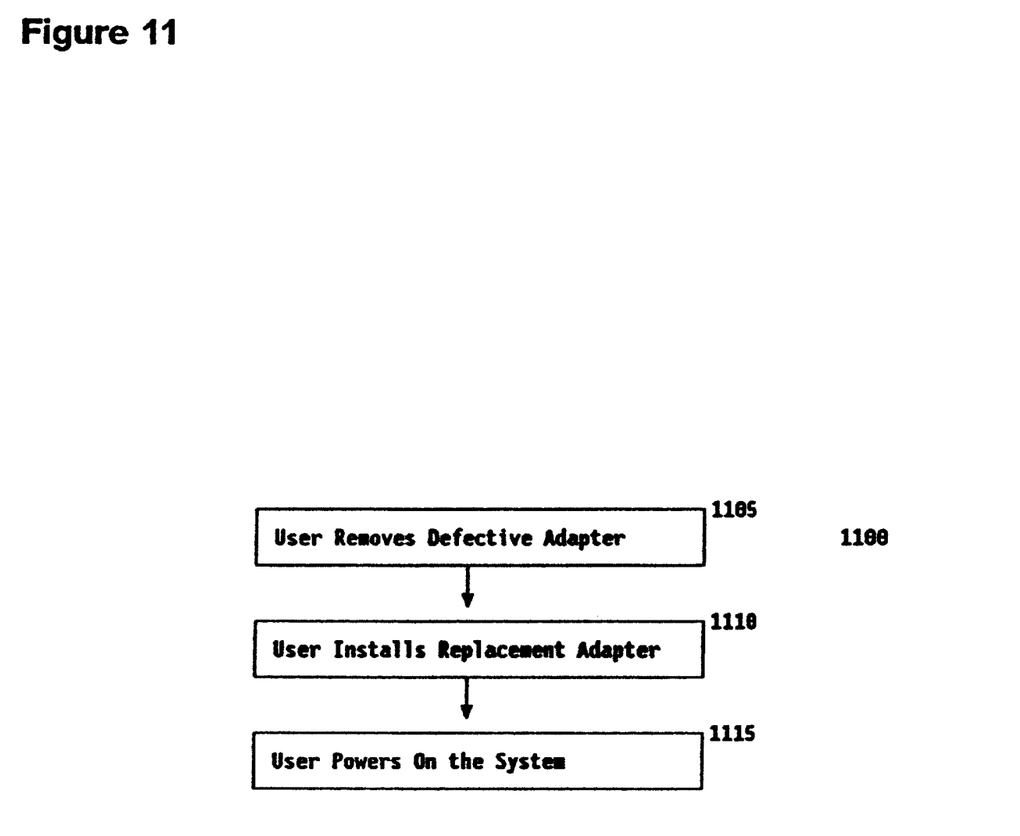
FIG. 11 is a flow diagram showing the method by which a defective adapter card is serviced and FIG. 12 is a flow diagram showing the method by which a new adapter is added to the computer system.

Referring now to FIG. 11, there is shown a flow diagram of Servicing an Existing Adapter 1100. This figure shows the adapter replacement process such as replacing a defective adapter. The user or servicer removes the defective adapter, step 1105, installs an identical replacement, step 1110, and powers on the system, step 1115. No configuration data is lost in this procedure.

Figure 12:
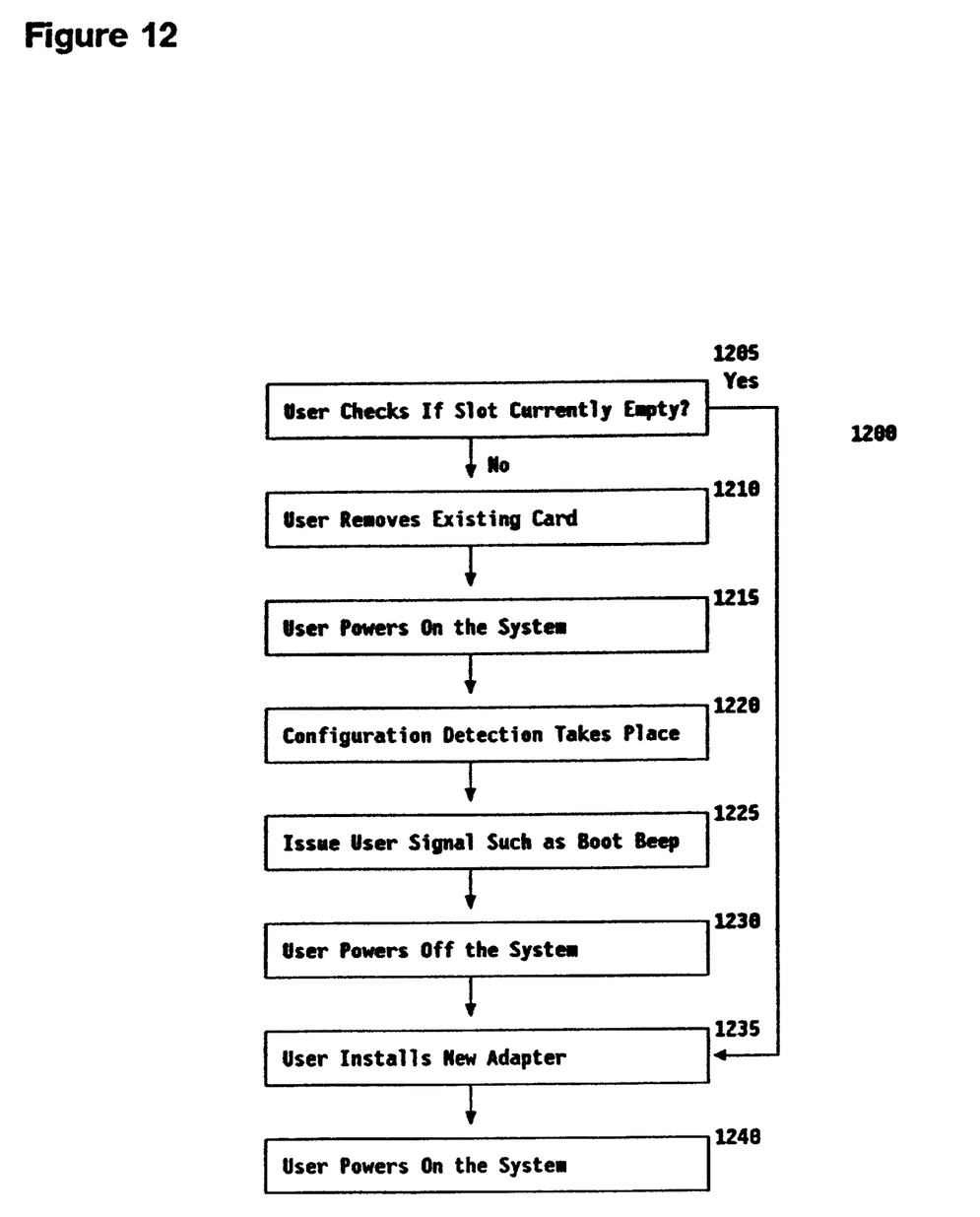

Referring now to FIG. 12, there is shown a flow diagram of the Adapter Card Installation Process 1200. It is highly recommended that the user or servicer run the configuration utility prior to beginning the installation process. This will allow the user or servicer to determine the available resources which can be allocated to a new adapter. Note that moving an adapter within the system is a remove operation followed by an add operation. First, in step 1205, the user or servicer determines if the target ISA Expansion Slot 250–265 is currently empty through visual inspection. If the target ISA Expansion Slot 250–265 is empty, then the new adapter may be installed, step 1235, and the system powered on, step 1240. If the slot is occupied, as determined by step 1205, then the existing adapter must be removed, step 1210. Before the new adapter is added, the system must be powered on, step 1215, and the power on process allowed to operate, step 1220. During the operation of the power on code, the previously described Primary Control Flow 700 takes place. It is at this time that a removed card will be detected and its configuration data (if any) removed. When the programs of ROM/BIOS 230 complete, a signal such as a distinctive boot beep is emitted, step 1225. The user then powers the system off, step 1230, and installs the new adapter, step 1235. The system may then be powered on, step 1240, at which point the previously described Primary Control Flow 700 takes place.

To isolate potential problems most effectively, only one adapter should be added to the system at a time. In the event that more than one adapter is to be added to the system, the above procedure should be run in its entirety for each adapter, one at a time.

While the invention has been shown and described with reference to particular embodiments thereof, it will be understood by those skilled in the art that the foregoing and other changes in form and detail may be made therein without departing from the spirit and scope of the invention. It will also be understood that the invention may be implemented using either hardware components or software code or a combination thereof.

What is claimed is:

1. An apparatus for isolating, during system configuration, a device connected to a bus expansion unit comprising:
   a platform including at least one housing slot for connecting at least one device to said expansion unit;
   means for ascertaining whether said device is installed in said housing slot, said ascertaining means including
   means for determining whether said housing slot switched from a full status to an empty status or vice versa since a preceding system configuration;
   means for deleting configuration of said device if said housing slot switched from a full status to an empty status;
   first determining means for determining whether said device is one of a plurality of different types of devices if said configuration status of said device is deleted and said housing slot switched from an empty status to a full status;

second determining means for determining if said device is defective;

means for clearing a corresponding slot enable mask to indicate that said device has been newly installed in said housing slot and is not configured if said device is not a software configurable type of devices and means for configuring said device if said device is a software configurable type of devices; and means, responsive to the second determining means, for disabling said device if said device is defective.

2. The apparatus of claim 1 further comprising a configuration flag wherein a set configuration flag indicates manual input of configuration data.

3. A method of isolating, during system configuration, a device connected to a bus expansion unit comprising the steps of:

ascertaining whether said device is connected to said bus expansion unit by being installed in a housing slot of a system platform, said step of ascertaining including the step of determining whether said housing slot switched from a full status to an empty status or vice versa since a preceding system configuration;

deleting configuration of said device if said housing slot switched from a full status to an empty status;

first step of determining whether said device is one of a plurality of different types of devices if said configuration status of said device is deleted and said housing slot switched from an empty status to a full status;

second step of determining if said device is defective;

clearing a corresponding slot enable mask to indicate that said device has been newly installed in said housing slot and is not configured if said device is not a software configurable type of devices and configuring said device if said device is a software configurable type of devices; and disabling said device if said device is defective.

4. The method of claim 3 further comprising the step of checking a configuration flag to determine whether said configuration flag is set, a set configuration flag indicating manual input of configuration data.

5. A computer program product for use with a computer system, said computer program product comprising:

computer readable program code means for ascertaining, during system configuration, whether a device is installed in a housing slot of a platform of a bus expansion unit, said ascertaining means including means for determining whether said housing slot switched from a full status to an empty status or vice versa since a preceding system configuration;

computer readable program code means for deleting configuration of said device if said housing slot switched from a full status to an empty status;

first computer readable program code determining means for determining whether said device is one of a plurality of different types of devices if said configuration status of said device is deleted and said housing slot switched from an empty status to a full status;

second computer readable program code determining means for determining if said device is defective;

computer readable program code means for clearing a corresponding slot enable mask to indicate that said device has been newly installed in said housing slot and is not configured if said device is not a software configurable type of devices and for configuring said device if said device is a software configurable type of devices; and computer readable program code means, responsive to the second determining means, for disabling said device if said device is defective.

6. The computer program of claim 5 further comprising a computer readable program code means for setting a configuration flag indicating manual input of configuration data.

7. A computer system having capability of isolating a device connected to a bus expansion unit during system configuration comprising:

a system platform including at least one housing slot for housing at least one bus expansion unit, said bus expansion unit having at least one expansion slot for connecting a device to said bus expansion unit;

a processor for processing data representing (1) whether said device is installed in said housing slot, (2) whether said device is working properly, (3) whether said housing slot switched from a full status to an empty status or vice versa since a preceding system configuration;

means for deleting configuration of said device if said housing slot switched from a full status to an empty status;

first determining means for determining whether said device is one of a plurality of different types of devices if said configuration status of said device is deleted and said housing slot switched from an empty status to a full status;

second determining means for determining if said device is defective;

means for clearing a corresponding slot enable mask to indicate that said device has been newly installed in said housing slot and is not configured if said device is not a software configurable type of devices and for configuring said device if said device is a software configurable type of devices; and means, responsive to the second determining means, for disabling said device if said device is defective.

8. The computer system of claim 7 further comprising a configuration flag wherein a set configuration flag indicates manual input of configuration data.

* * * * *